US007343953B2

(12) United States Patent
Smith

(10) Patent No.: US 7,343,953 B2
(45) Date of Patent: Mar. 18, 2008

(54) METHOD AND APPLICATION FOR APPLYING LABELS ON SURFACES OF SELECTED SURFACES OF VARYING ORIENTATIONS

(75) Inventor: Steven L. Smith, Buford, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 698 days.

(21) Appl. No.: 10/855,997

(22) Filed: May 28, 2004

(65) Prior Publication Data

US 2005/0263535 A1 Dec. 1, 2005

(51) Int. Cl.

| | |
|---|---|
| ***B29C 65/50*** | (2006.01) |
| ***B65C 9/36*** | (2006.01) |
| ***B65H 5/04*** | (2006.01) |
| *B29C 65/02* | (2006.01) |
| *B32B 37/12* | (2006.01) |
| *B65C 11/02* | (2006.01) |

(52) U.S. Cl. ...................... 156/566; 156/362; 156/363; 156/556; 156/574

(58) Field of Classification Search ................ 156/358, 156/362, 363, 589, 539, 574, 580, 581, 556, 156/566, 567, 568, DIG. 1, DIG. 2, DIG. 28, 156/DIG. 31, DIG. 37

See application file for complete search history.

(56) References Cited

U.S. PATENT DOCUMENTS 1,675,692 A * 7/1928 Bronander .................. 156/457
3,970,499 A * 7/1976 Bommes ..................... 156/227
3,984,227 A 10/1976 McConnell et al.
4,108,710 A 8/1978 Hoffman
4,323,416 A 4/1982 Malthouse et al.
4,397,709 A 8/1983 Schwenzer (Continued)

FOREIGN PATENT DOCUMENTS

WO WO 01/37203 5/2001

*Primary Examiner*—Philip Tucker
*Assistant Examiner*—Sonya Mazumdar
(74) *Attorney, Agent, or Firm*—Alston & Bird LLP

(57) ABSTRACT

A device and method of using same is provides which includes the use of an apparatus configured to apply labels to parcels moving along a conveyor belt. The apparatus of the present invention includes a support frame, a pair of turntable assemblies, a corresponding pair of arm assemblies, similarly corresponding arm assembly drive motors, a label application head assembly, a label printer/supplier, and a controlling apparatus. The support frame supports the pair of two turntable assemblies. Each of the turntable assemblies supports one of the arm assemblies such that each of the arm assemblies is pivotable about a horizontal axis. Each of the arm assemblies is also movable along its longitudinal axis relative to its respective turntable. The lower ends of arm assemblies are attached together in a hinged connection. At one end of one of the arm assemblies is attached a label application head assembly. This attachment is a pivoting connection that allows for label application to the horizontal or vertical surfaces of parcels passing thereby. The turntable assemblies are not powered, but allow for a relatively free pivoting connection of the arm assemblies relative to the stationary support frame. However, the linear movement of the arm assemblies along their longitudinal axis is powered by corresponding arm assembly drive motors. This linear movement is independently controlled by a controlling apparatus, such that the label application head assembly can be positioned at various desired locations above a conveyor belt or other supporting surface.

19 Claims, 9 Drawing Sheets

U.S. PATENT DOCUMENTS

| | | | | | |
|---|---|---|---|---|---|
| 4,526,648 | A | | 7/1985 | Tochtermann | |
| 4,544,431 | A | | 10/1985 | King | |
| 4,676,859 | A | | 6/1987 | Cleary, Jr. et al. | |
| 4,784,714 | A | | 11/1988 | Shibata | |
| 5,855,710 | A | | 1/1999 | Hinton | |
| 5,858,168 | A | | 1/1999 | Hinton | |
| 5,902,450 | A | * | 5/1999 | Jones | 156/542 |
| 5,988,251 | A | * | 11/1999 | Hunt et al. | 156/539 |
| 6,080,250 | A | | 6/2000 | Urban et al. | |
| 6,391,132 | B1 | | 5/2002 | Kinnemann et al. | |
| 6,596,105 | B2 | | 7/2003 | Kendall, Jr. | |
| 6,763,870 | B2 | * | 7/2004 | Spatafora et al. | 156/483 |
| 2002/0168212 | A1 | | 11/2002 | Nedblake, Jr. et al. | |
| 2005/0082012 | A1 | * | 4/2005 | Spatafora et al. | 156/567 |

* cited by examiner

METHOD AND APPLICATION FOR APPLYING LABELS ON SURFACES OF SELECTED SURFACES OF VARYING ORIENTATIONS

BACKGROUND OF THE INVENTION

1. Field of the Invention

The present invention relates generally to the placement or reading of labels, markings, or other items on parcels or other items being conveyed along a conveying path.

2. Description of Related Art

The prior art includes many different methods and apparatuses for applying labels to parcels or other items to parcels as they pass along a conveying path. However, there are always needs in the art and improvements needed thereto.

BRIEF SUMMARY OF THE INVENTION

The present invention overcomes the deficiencies of the prior art by providing a method and apparatus for attaching labels (including bar or other coded labels and including but not limited to RFID labels) or other articles to parcels or other items.

Generally described, the invention is directed towards a method and apparatus for transferring labels or other items to an outer surface of parcels being conveyed along a conveying path, the path having a width and defined by a conveying surface having a portion lying in a conveying plane, the parcels having horizontal and vertical surfaces, the apparatus comprising a relatively stationary frame, a first turntable assembly, the first turntable assembly itself comprising a first stationary turntable portion attached relative to the stationary frame, and a first rotating turntable portion rotatably attached relative to the first stationary turntable portion such that the first rotating turntable portion can rotate about a first turntable axis relative to the first stationary turntable portion and the frame, a second turntable assembly, the second turntable assembly itself comprising a second stationary turntable portion attached relative to the stationary frame, and a second rotating turntable portion rotatably attached relative to the second stationary turntable portion such that the second rotating turntable portion can rotate about a second turntable axis relative to the second stationary turntable portion and the frame, a first elongate arm mounted relative to the first rotating turntable portion so as to allow for linear movement of the first elongate arm relative to the first rotating turntable portion along a first linear path substantially parallel to the longitudinal axis of the first elongate arm, yet the first elongate arm is also allowed to rotate about the first turntable axis along with the first rotating turntable portion, a second elongate arm mounted relative to the second rotating turntable portion so as to allow for linear movement of the second elongate arm relative to the second rotating turntable portion along a second linear path substantially parallel to the longitudinal axis of the second elongate arm, yet the second elongate arm is also allowed to rotate about the second turntable axis along with the second rotating turntable portion, a pivoting connection intermediate and connecting the first and second elongate arms, a first arm drive means to provide a force sufficient to cause the first elongate arm to move along the first linear path relative to the first rotating turntable portion, a second arm drive means to provide a force sufficient to cause the second elongate arm to move along the second linear path relative to the second rotating turntable portion, and a label application head attached relative to one of the first and second elongate arms, such that the label application head may be moved to various locations across the width of the conveyor path and at different heights relative to the conveyor surface, and the label application head may be manipulated to dispense labels or other items upon surfaces of parcels being conveyed along the conveying surface.

The invention is further directed towards a method for transferring labels or other items to an outer surface of parcels being conveyed along a conveying path, said path having a width and defined by a conveying surface having a portion lying in a conveying plane, said parcels having horizontal and vertical surfaces, said method comprising the steps of providing a relatively stationary frame, providing a first turntable assembly, said first turntable assembly itself comprising a first stationary turntable portion attached relative to said stationary frame, and a first rotating turntable portion rotatably attached relative to said first stationary turntable portion such that said first rotating turntable portion can rotate about a first turntable axis relative to said first stationary turntable portion and said frame, providing a second turntable assembly, said second turntable assembly itself comprising a second stationary turntable portion attached relative to said stationary frame, and a second rotating turntable portion rotatably attached relative to said second stationary turntable portion such that said second rotating turntable portion can rotate about a second turntable axis relative to said second stationary turntable portion and said frame, providing a first elongate arm mounted relative to said first rotating turntable portion so as to allow for linear movement of said first elongate arm relative to said first rotating turntable portion along a first linear path substantially parallel to the longitudinal axis of said first elongate arm, yet said first elongate arm is also allowed to rotate about said first turntable axis along with said first rotating turntable portion, providing a second elongate arm mounted relative to said second rotating turntable portion so as to allow for linear movement of said second elongate arm relative to said second rotating turntable portion along a second linear path substantially parallel to the longitudinal axis of said second elongate arm, yet said second elongate arm is also allowed to rotate about said second turntable axis along with said second rotating turntable portion, providing a pivoting connection intermediate and connecting said first and second elongate arms, providing a first arm drive means to provide a force sufficient to cause said first elongate arm to move along said first linear path relative to said first rotating turntable portion, providing a second arm drive means to provide a force sufficient to cause said second elongate arm to move along said second linear path relative to said second rotating turntable portion, and providing a label application head pivotably attached relative to one of said first and second elongate arms, manipulating said label application head about said label head axis, and at the same time operating first and second arm drive means so as to cause said first and second arm assemblies to move along said first and second linear paths, respectively, relative to said first and second rotating turntable portions, respectively, moving said label application head to various locations across the width of said conveyor path and at different heights relative to said conveyor surface, and manipulating said label application head to suitably different orientations to dispense labels or other items upon both horizontal and vertical surfaces of parcels being conveyed along said conveying surface.

Therefore, it is an object of the present invention to provide an improved method and apparatus for applying labels or other items to separate items.

It is a further object of the present invention to provide an improved method and apparatus for applying adhesive labels to items on a conveyor.

It is a further object of the present invention to provide an improved method and apparatus for applying labels including RFID features to items having horizontal or vertical supporting surfaces.

It is a further object of the present invention to provide an improved method and apparatus for applying labels or other items to parcels on a conveyor, such that the label or other item can be placed on both vertical and horizontal surfaces of the parcels.

It is a further object of the present invention to provide a method and apparatus for providing labels or other items on items which is reliable.

It is a further object of the present invention to provide a method and apparatus for providing labels or other items on items which is efficient.

It is a further object of the present invention to provide a method and apparatus for providing labels or other items on items which is versatile.

It is a further object of the present invention to provide a method and apparatus for providing labels or other items on items which is adjustable.

It is a further object of the present invention to provide a method and apparatus for positioning an item proximate conveyors on which packages are transported.

It is a further object of the present invention to provide a method and apparatus for positioning a scanner or other reading device relative to parcels or other items as they are conveyed thereby.

Other objects, features, and advantages of the present invention will become apparent upon reading the following detailed description of the preferred embodiment of the invention when taken in conjunction with the drawing and the appended claims.

BRIEF DESCRIPTION OF THE SEVERAL VIEWS OF THE DRAWINGS

Figure 1:
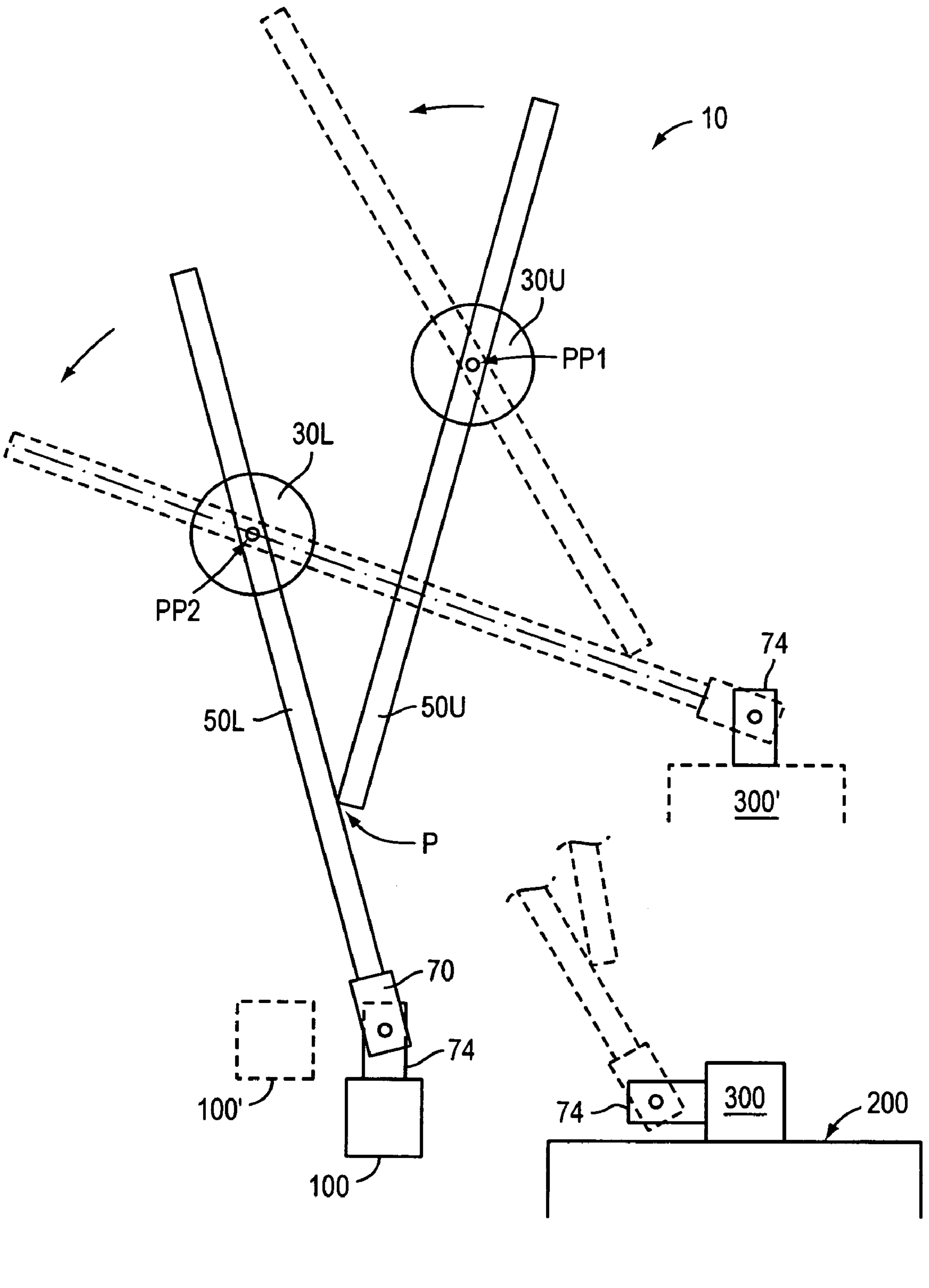

Having thus described the invention in general terms, reference will now be made to the accompanying drawings, which are not necessarily drawn to scale, and wherein:

FIG. 1 is an illustrative view illustrating the apparatus 10 in operation. Multiple positions of a label application member 74 (being part of a label application head assembly 70) are shown, both in association with a label printer/supplier 100 (also in an alternate location 100'), as well as in positions for depositing labels on parcels 300, 300', which are positioned atop a conveyor or other supporting surface 200. Upper and lower rotating turntable assemblies 30U, 30L, are shown which support upper and lower arm assemblies 50U, 50L, respectively, to allow them to pivot about pivot points PP1, PP2, respectively while still being able to move linearly along their length relative to the rotating part of the turntable. The lower ends of the upper and lower upper arm assemblies 50U, 50L are pivotably attached at a pivot location "P", said pivot location being not at the end but proximate the end of the lower arm assembly 50L, said pivoting connection being along an axis being substantially horizontal and parallel to the conveyor direction.

Figure 2:
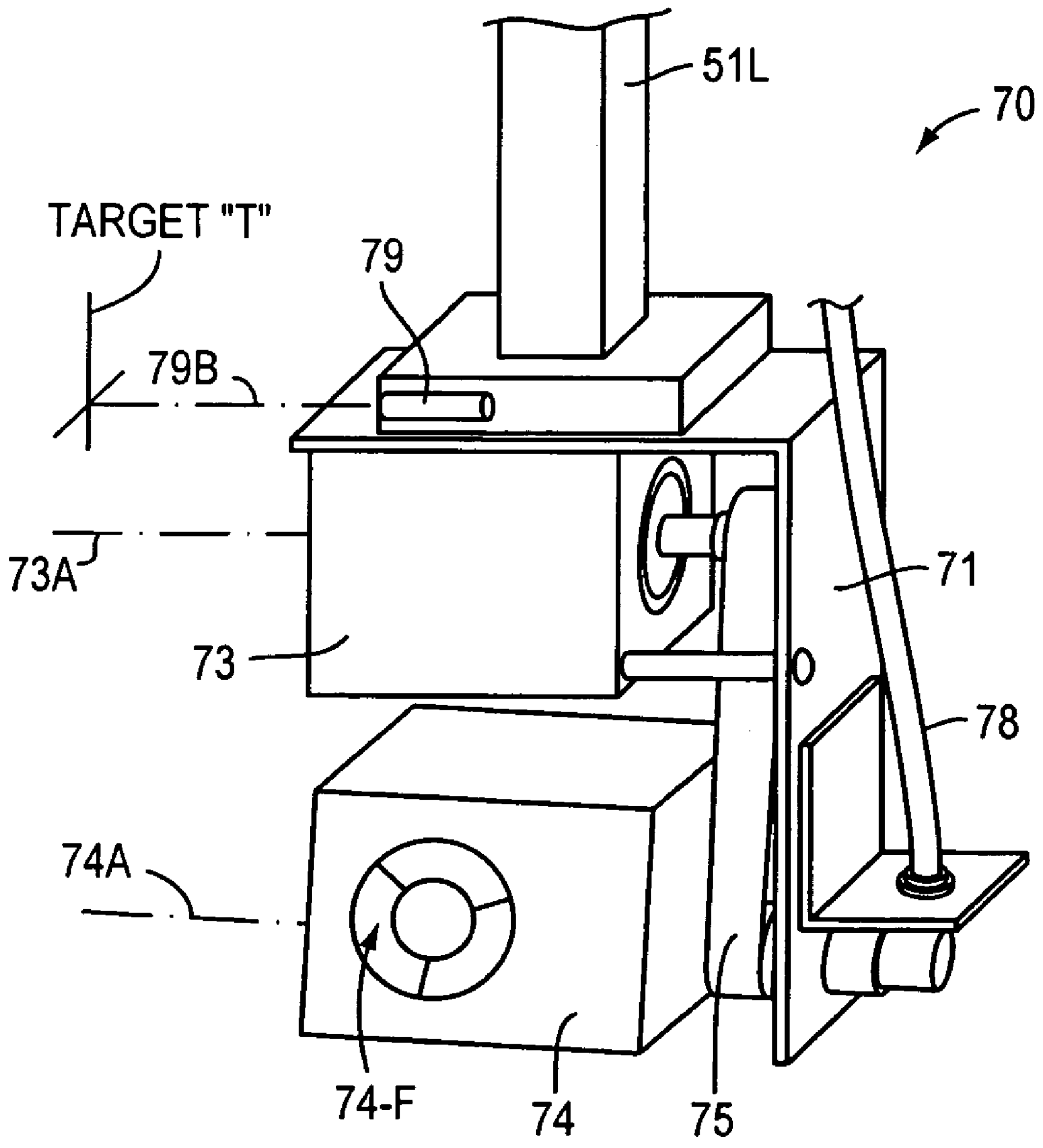

FIG. 2 is a partial pictorial view of the label application head assembly 70, attached to the lower end of a lower arm main frame element 51L (being part of the upper arm assembly). The label application head assembly 70 is rigidly attached relative to the lower end of the lower arm assembly 50L. The label application head assembly 70 includes the following elements: a frame 71, a servo motor 73, a label application member 74 (having a fan side opening 74-F shown in FIG. 2 and a label side opening 74-L shown later in FIG. 7A), an applicator position endless drive belt 75, various control wires and air supply tubes 78, and an optional home position indicator (laser) 79. The laser 79, which emits a laser beam 79B, which can be pointed towards a stationery target T, for "homing" purposes. The servo motor 73 rotatably drives a drive pulley (seen later in FIGS. 7A and 7B as 73P) about an axis 73A. The label application member 74 is pivotably mounted relative to the frame 71 of the label applicator assembly 70 about an axis 74A, and picks up and subsequently dispenses labels as discussed later in this application.

Figure 3:
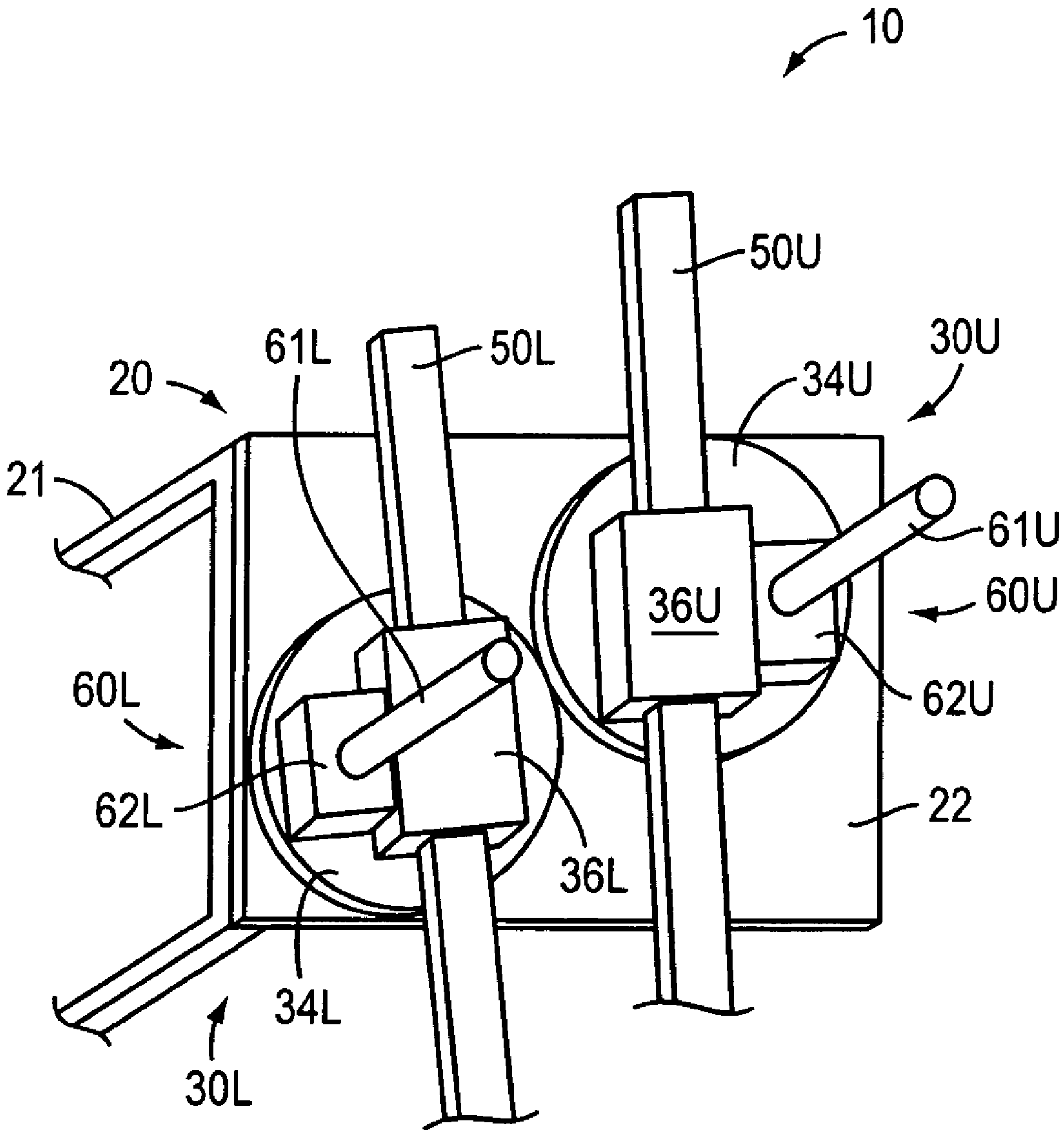
Figure 4:
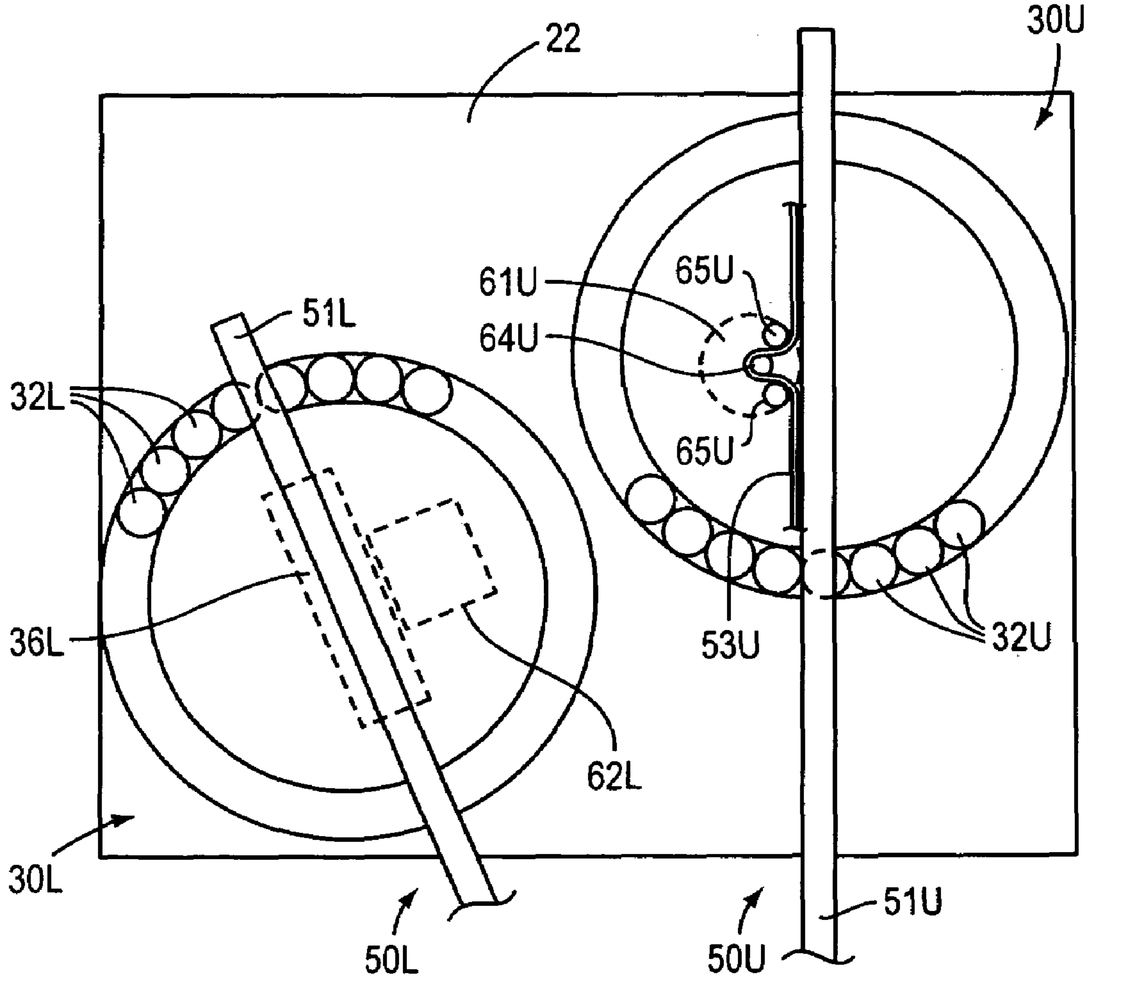

FIG. 3 is a partial pictorial view of a portion of the assembly 10, namely the portion which includes a support frame 20 (having typical frame elements 21), a breakaway support plate 22, upper and lower turntable assemblies 30U, 30L, upper and lower arm assemblies 50U, 50L, and upper and lower arm assembly drive motors 61U, 61L. Also shown are the rotating outer turntable portion 34U of the upper turntable assembly 30U, the rotating outer turntable portion 34L of the lower turntable assembly 30L, the upper and lower linear bearing assemblies 36U, 36L, respectively, and upper and lower gearbox assemblies 62U, 62L, respectively. It should be understood that the upper and lower gearbox assemblies could be located on either side of the upper and lower linear bearing assemblies 36U, 36L; FIG. 4 shows an alternate layout.

FIG. 4 is an illustrative view illustrating the interaction of the upper and lower turntable assemblies 30U, 30L and the upper and lower arm assemblies 50U, 50L (each of which includes a respective main frame element (50U, 50L). Typical turntable bearings 32U, 32L, are shown, which are the bearings intermediate the stationary inner turntable portions and the rotating outer turntable portions discussed later in this application. Also shown illustratively are the lower linear bearing assembly 36L (in phantom), and the lower gearbox assembly 62L (also in phantom). Also shown is the upper motor 61U (in phantom), two upper idler gears 65U, and an upper drive cog 64U. Finally, a portion of the upper cogged belt 53U is shown, although the ends of the belt are not shown in their anchored locations attached to the upper arm frame element 51U as known in the art.

Figure 5A:
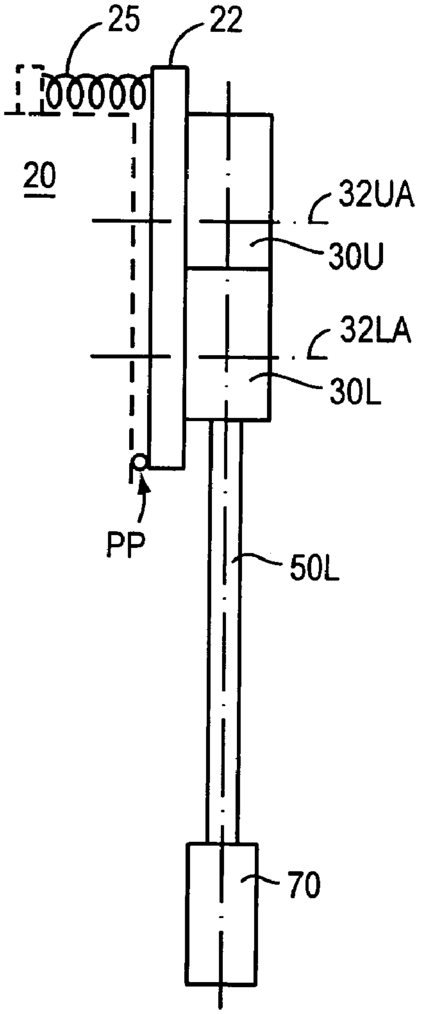
Figure 5B:
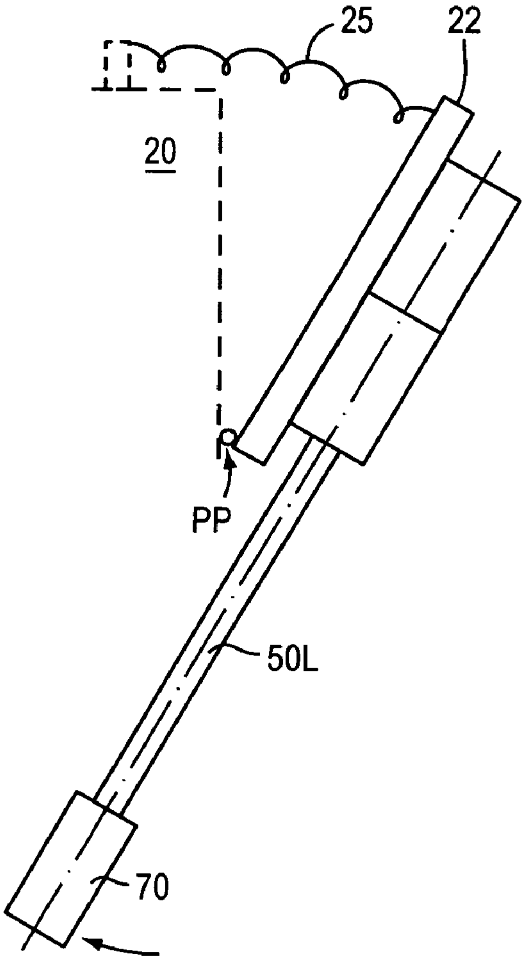

FIGS. 5A and 5B are illustrative figures, illustrating the pivoting connection of a portion of the apparatus 10 about a pivot point PP. Shown is a breakaway support plate 22 pivotably mounted relative to the support frame 20 about a pivot point PP. Illustratively are also shown the upper and lower turntable assemblies 30U, 30L, which are attached to the breakaway support plate 22. Lower arm assembly 50L is shown, although the upper arm assembly is understood to be behind the lower arm assembly but is not shown. It should also be understood that the lower arm assembly is shown in simplified form, as various control lines, etc are in reality attached to and extended therefrom. Furthermore, the motors are not shown. Axes 32UA and 32LA are shown to illustrate the axes about which the upper and lower arm assemblies, respectively, are allowed to rotate. If an element such as a box moving on a conveyor contacts the label application head assembly 70, the apparatus pivots from the position shown in FIG. 5A to the position shown in FIG. 5B. A spring 25 provides a return feature as needed.

Figure 6:
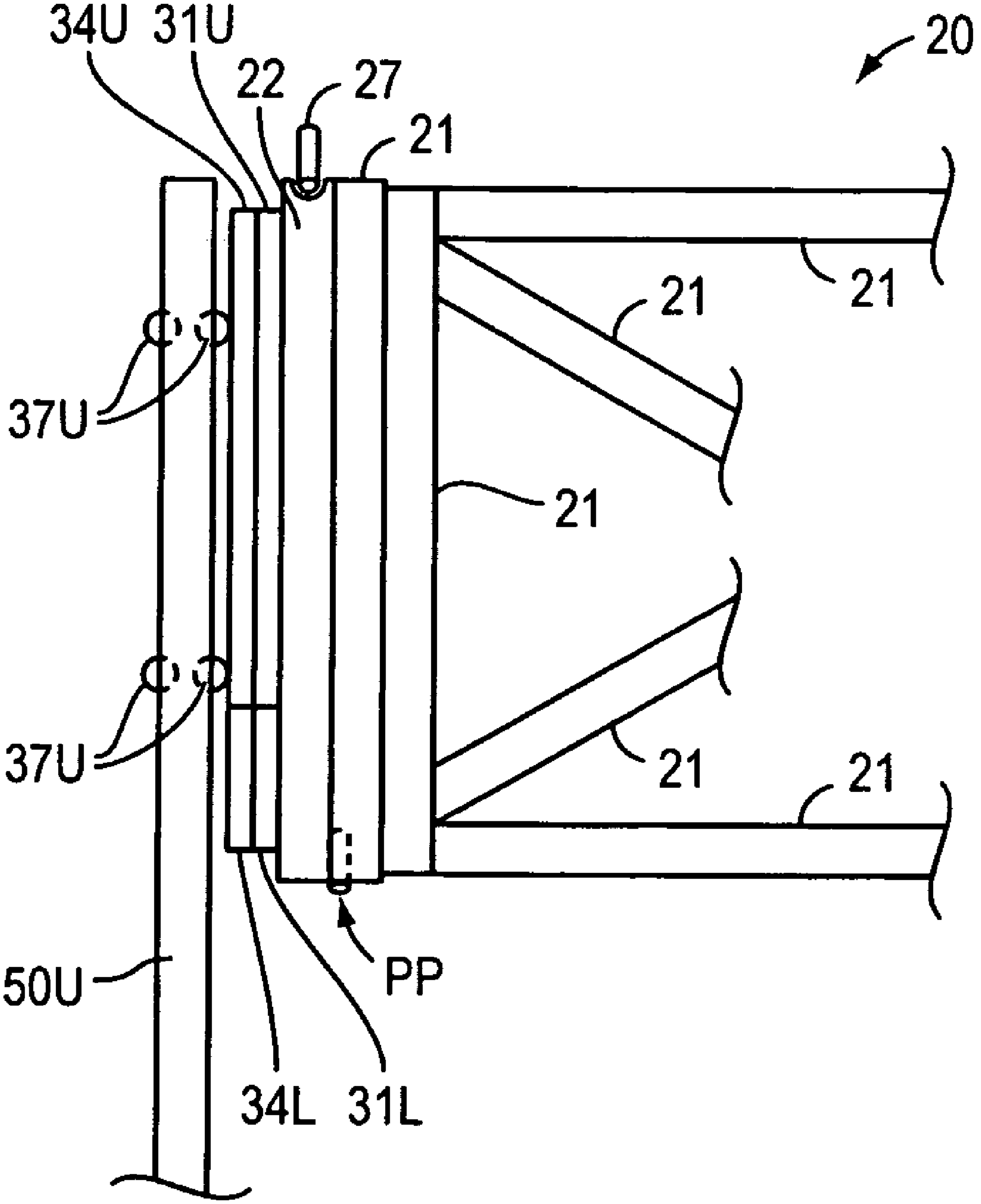

FIG. 6 is a side illustrative view showing the manner of support provided the upper arm assembly 50U relative to the frame 20 having typical frame elements 21. This figure shows the breakaway support plate 22 pivotably attached at pivot point PP relative to the frame 20, with a presence sensor 27 being used to provide a control indication that the breakaway support plate 22 is in the position of FIG. 6, or alternately in the position of FIG. 5B. The return spring is not shown. The inner and outer turntable portions 31U, 34U for the upper turntable assembly 30U are shown, as are the inner and outer turntable portions 31L, 34L for the lower turntable assembly 30L shown. Also shown are the linear bearings 37U that provide for the linear movement between the upper arm assembly 50U and rotating outer turntable portions 34U of the upper turntable assembly 30U.

Figure 7B:
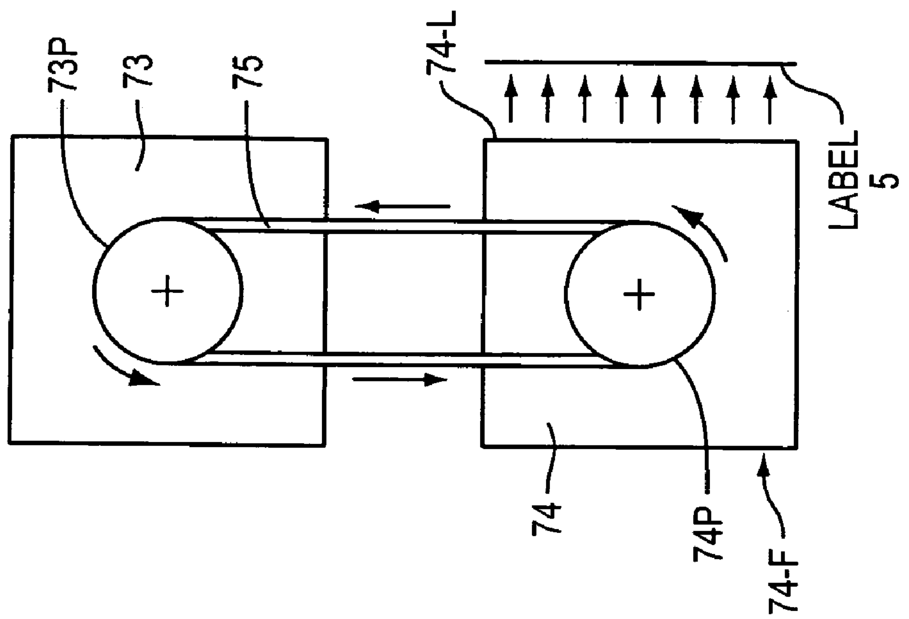
Figure 7A:
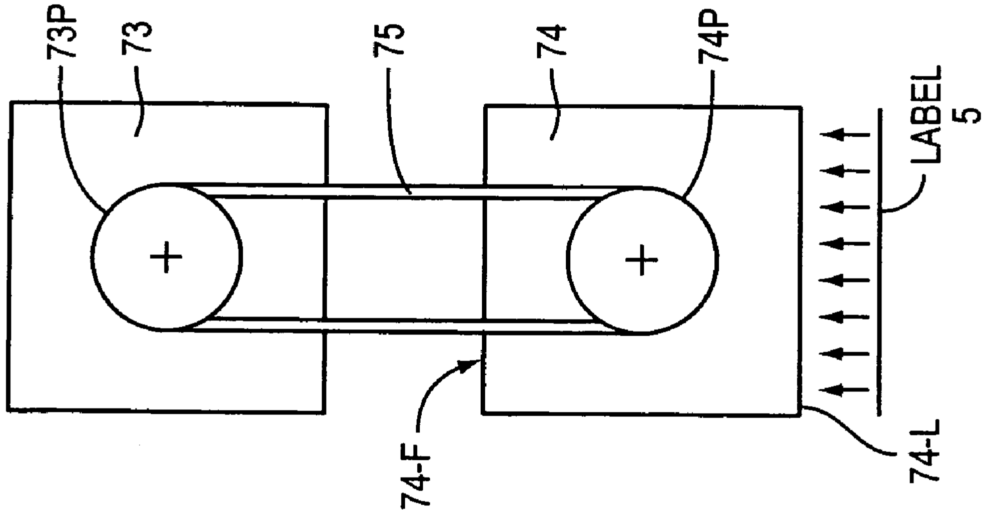

FIGS. 7A and 7B are illustrative views, illustrating the operation and interaction of the servo motor 73, the drive belt 75, and the label application member pulley 74P. FIG. 7A shows the label application member 74 oriented with its active side (a.k.a. the label side opening 74-L) in a "down" orientation, such as would be used in picking up a label. FIG. 7B shows the member 74 rotated 90° in order to position it so that a label can be applied to a vertical surface, such as the vertical surface of a package. It should be understood that range of motion of the member 74 is greater than 90°.

Figure 8:
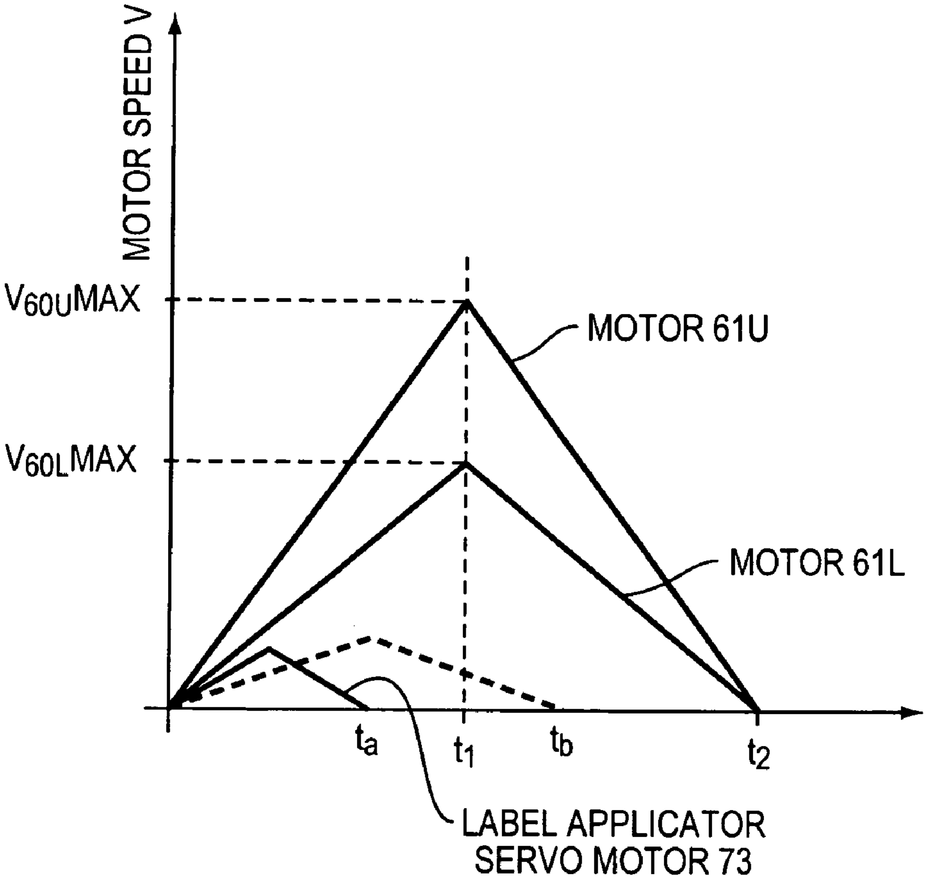

FIG. 8 is a graph showing the rotational velocity of various elements of the invention over time. Particularly, the graph shows the rotational velocity of the motor 61U over time, the rotational velocity of the motor 61L over time, and the rotational velocity of the label application assembly's servo motor 73 (two exemplary situations are shown).

Figure 9:
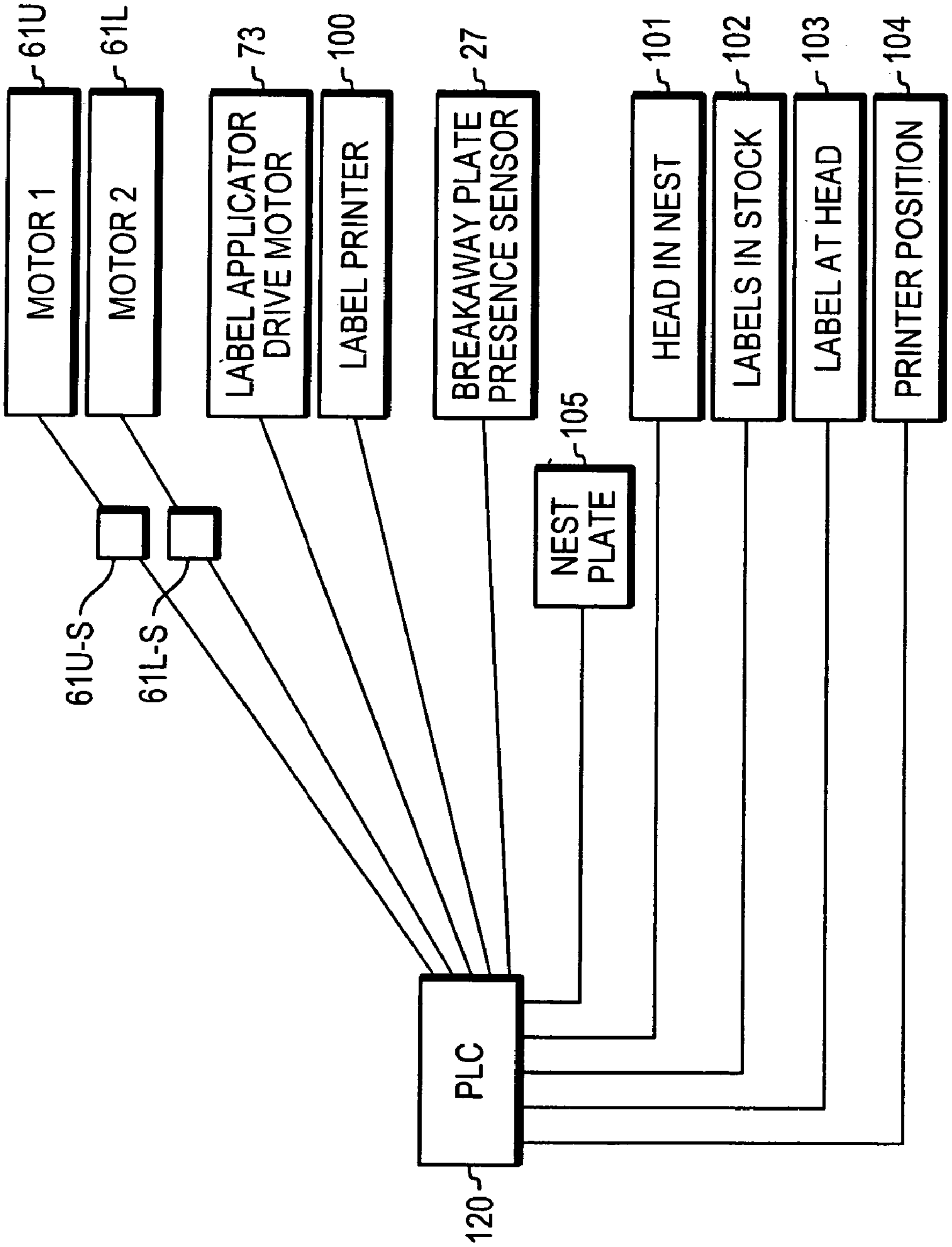

FIG. 9 is a schematic view illustrating the operable connection and association between the control apparatus 120 (shown 678 358 1869 in one example as including a PLC) the motors 61U, 61L, and their associated servo amps 61U-S, 61L-S, the label applicator drive motor 73, the label printer 100, and the breakaway plate presence sensor 27. Also shown is a "Head in Nest" sensor 101, which is a sensor that recognizes when the label application head assembly 70 is in its "nest" which is the used to indicate that it is ready to receive labels. Also shown is a "Labels in Stock" sensor 102, which is configured to provide a signal to the PLC 120 that a certain pre-determined number of labels are left in the printer. This can be used for planning purposes; in one embodiment when the label printer 100 is out of labels, it sends a signal to the PLC, but by this time the system has to be stopped. Also shown in a "label at head" sensor 103, which allows the system to know that the label applicator 74 has received a new label from the printer. Also shown is a "Printer Position" sensor 104, which provides an indication to the overall system that the printer is in its operating position. This is to be distinguished from a service position which may be used when the printer is being serviced or provided with Label Stock. Also shown is a "Nest Plate" sensor 105, which is a sensor operably associated with a plate that acts as a last resort damage prevention device to prevent the label application head assembly 70 from colliding with the printer or other devices. This is to address an emergency condition that is otherwise to be avoided, such as in the case of if the label applicator has gone too far.

Figure 10:
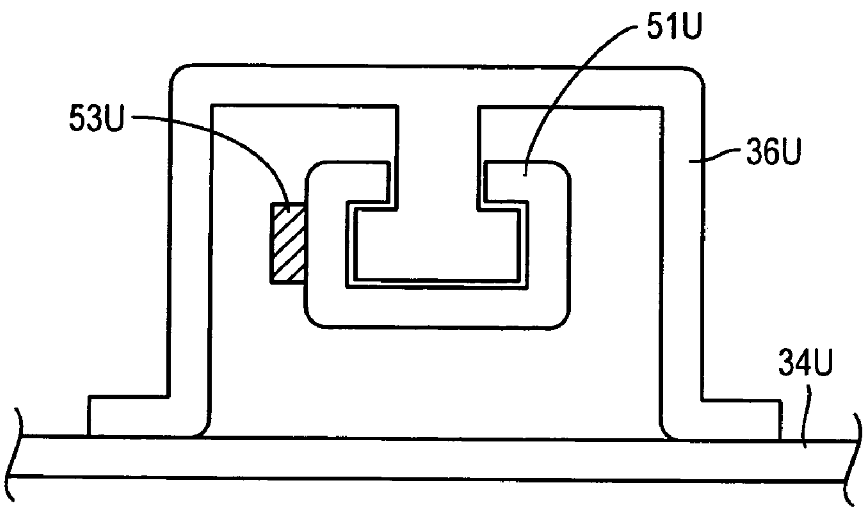

FIG. 10 is an illustrative view of the transverse cross section of an upper arm main frame element 51U, as it is retained for linear movement relative to a upper linear bearing assembly 36U. The upper linear bearing assembly 36U is attached to the rotating outer turntable portion 34U. The upper cogged belt 53U is also shown in transverse cross section. However it should be understood that the upper cogged belt 53U could be on either side of the upper arm main frame element 51U. Bearings as known in the art exist but are not shown between the upper arm main frame element 51U and the T-shaped spinelike portion of the upper linear bearing assembly 36U. However it may readily be understood that bearings may be provided therebetween, typically held by races fixed to the member 36U, to allow for the bearings (not shown) to roll on the member 51U and to facilitate linear movement of the member 51U relative to the member 36U, along an axis substantially normal to the sheet of paper bearing the drawing. Other linear bearing configurations could be used without departing from the spirit and scope of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

General Construction and Operation

The apparatus 10 according to the present invention is configured to apply labels such as 5 (see FIGS. 7A and 7B) to parcels 300 moving along a conveyor belt 200.

Referring generally to all the figures, the apparatus 10 of the present invention includes a support frame 20, a pair of turntable assemblies 30U, 30L, a corresponding pair of arm assemblies 50U, 50L, similarly corresponding arm assembly drive motors 61U, 61L, a label application head assembly 70, a label printer/supplier 100, and a controlling apparatus 120.

The support frame 20 supports the pair of two turntable assemblies 30U, 30L. Each of the turntable assemblies 30U, 30L supports one of the arm assemblies 50U, 50L, such that each of the arm assemblies 50U, 50L is pivotable about a horizontal axis. Each of the arm assemblies is also movable along its longitudinal axis relative to its respective turntable.

The lower ends of arm assemblies 50U, 50L are attached together in a hinged connection. At one end of one of the arm assemblies is attached a label application head assembly 70. This attachment is a pivoting connection that allows for label application to the horizontal or vertical surfaces of parcels passing thereby.

The turntable assemblies 30U, 30L are not powered, but instead are "idling" in that they allowed for a relatively free pivoting connection of the arm assemblies 50U, 50L relative to the stationary support frame. However, the linear movement of the arm assemblies 50U, 50L along their longitudinal axis is powered by corresponding arm assembly drive motors 61U, 61L. This linear movement is independently controlled by a controlling apparatus 120, such that the label application head assembly can be positioned at various desired locations above a conveyor belt or other supporting surface.

More Detailed Discussion

More details are now discussed. The previous description of the figures may be referenced in combination with this discussion.

The Support Frame 20

Referring now to FIGS. 3, 4, and 5A-5B, the frame 20 of the assembly 10 is configured to be substantially stationary and configured to be located proximate beside of a conveyor 200.

The frame 20 is substantially stationary, including frame members such as 21, but includes a portion that is pivotable relative to the main portion of the frame 20. This portion is designated as 22, and shall be referenced as a "breakaway support plate 22". This breakaway support plate 22 is configured to support both of the turntables 30U, 30L, as noted above.

As shown particularly in FIGS. 5A, 5B, and FIG. 6, the breakaway support plate 22 is pivotably attached relative to the main portion of the frame proximate pivot point PP. A tension spring is located at 25 and configures to bias the breakaway support plate 22 in its position such as shown in FIG. 5A. However, it should be understood that the breakaway support plate 22 may pivot from a position shown in FIG. 5A to a position shown in FIG. 5B.

Should an object (such as a parcel) contact the label application head assembly 70, where the force is above a pre-determined amount, the breakaway support plate 22 will function. As may be understood, the breakaway support plate 22 "breaks away" from its home position shown in FIG. 5A by pivoting about the pivot point PP; as the force pushes against the label application head assembly 70, this force is transferred from the label application head assembly 70 to both of the upper and lower arm assemblies 50U, 50L. This force is further transferred to the upper and lower turntable assemblies 30U, 30L. As the turntable members 30U, 30L are rotatably yet otherwise rigidly attached to the breakaway support plate 22, it may be understood that the force on the label application head assembly 70 causes a moment which causes the breakaway support plate 22 to "break away" to the position shown in FIG. 5B, such that the label application head assembly 70 can move relatively downstream along the conveyor path and upwardly relative to the conveyor 200, thus reducing the risk of damage thereto.

It should be understood that a sensor 27 (See FIG. 6) is provided in operable association with the breakaway support plate 22, such that the overall apparatus 10 (including the system controls) can control other related elements should the sensor recognized that the breakaway support plate 22 has "broken away". For example, the motors 61U, 61L, and the conveyor 200 being used with the label applicator could be stopped until the obstruction is cleared or the situation is suitably rectified.

FIG. 6 illustrates a presence sensor 27. It may also be understood that a detent could also be used at that general location in order to provide an initial breakaway force, if deemed necessary. Under one configuration, no detent is used, and the springs are adjusted so that 10 pounds are all that is necessary to deflect the spring and cause the configuration to pivot from the position shown in FIG. 5A to FIG. 5B.

The Upper and Lower Turntable Assemblies 30U, 30L

Referring now particularly to FIGS. 1, 5A and 5B, the upper and lower turntable assemblies 30U, 30L are mounted relative to the surface of the breakaway support plate 22. The turntable assemblies each include stationary and rotating portions which are operably connected by turntable bearings such as known in the art. Referring now also to FIGS. 3, 4, and 6, the upper turntable assembly 30U includes a stationary inner turntable portion 31U, bearings 32U, and a rotating outer turntable portion 34U. The lower turntable assembly 30L includes a stationary inner turntable portion 31L, bearings 32L, and a rotating outer turntable portion 34L.

The stationary inner turntable portions 31UL, 31L, respectively, are rigidly attached relative to the breakaway support plate 22. The rotating outer turntable portions 34U, 34L, are allowed to rotate about axes 32UA, 32LA, respectively, which are substantially parallel, and are, in one preferred embodiment, substantially horizontal, assuming the floor supporting the overall system is likewise substantially horizontal. However, it should be understood that this is one preferred embodiment only and should not be construed as limiting.

There are two types of bearings in the turntable assemblies: linear bearings and the actual rotational turntable bearings. It may be understood that in one preferred embodiment, the inner and the outer portions 31U, 34U, for example, include corresponding bearing races which contain the turntable bearings 32U. However, there are also linear bearings such as 37U, 37L, with elements 37U shown in FIG. 6 and discussed later, which allow the arm assemblies 50U, 50L, to move linearly along their longitudinal axis relative to the rotating outer turntable portions 34U, 34L, respectively.

The upper and lower turntable assemblies 30U, 30L include suitable bearings such as known in the art to provide suitable operational and wear characteristics. In one preferred embodiment, the turntable assemblies are free to rotate about their respective rotational axes, 32UA, 32LA, that is, the bearings supporting them relative to the frame member 21 of the frame 20 allows them to be considered "idling", except that normal frictional drag will be present.

As discussed in further detail later, the upper and lower turntable assemblies 30U, 30L, support corresponding upper and lower arm assemblies 50U, 50L, through the use of the rotating outer turntable portions 34U, 34L, which support the upper and lower arm assemblies while allowing them to move along linear paths relative thereto.

For purposes of discussion, it may also be noted that the upper turntable assembly 30U could be referenced as a "first" turntable assembly. It similarly could also be noted that the lower turntable assembly 30L could be referenced as a "second" turntable assembly. Furthermore, the upper arm assembly 50U could be referenced as a "first" arm assembly, and the lower arm assembly 50L could be referenced as a "second" arm assembly. Other elements may also be referenced as being "first" or "second". However, these terms are not to be construed as limiting but only to provide an accurate and understandable description of the invention. Furthermore, movement of a rotating turntable portion relative to its associated stationary turntable portion shall be understood generally as "turntable rotation".

The Arm Assemblies 50U, 50L

The respective interactions between the upper and lower turntable assemblies 30U, 30L and their respective upper and lower arm assemblies 50U, 50L are substantially similar, so for purposes of explanation, the interaction between the upper arm assembly 50U and the upper turntable assembly 30U will be discussed for purposes of explanation.

Referring particularly to FIGS. 3 and 4, the upper arm assembly 50U includes an upper arm main frame element 51U and also includes an upper cogged belt 53U. This cogged belt 53U is not an endless belt, but has upper and lower ends attached relative to the upper and lower ends of the upper arm main frame element 51U, respectively. As will be discussed in later detail, the cogged belt 53U is driven by a drive cog such that tension on the cogged belt causes movement of the upper arm main frame element 51U (which is part of the upper arm assembly 50U) along its linear path.

The main frame element 51U of the upper arm assembly 50U in one embodiment includes a transverse cross section which could be thought of as being "C"-shaped, as shown in FIG. 10.

FIG. 10 is an illustrative view of the transverse cross section of an upper arm main frame element 51U, as it is retained for linear movement relative to a upper linear bearing assembly 36U. The upper linear bearing assembly 36U is attached to the rotating outer turntable portion 34U. The upper cogged belt 53U is also shown in transverse cross section. However it should be understood that the upper cogged belt 53U could be on either side of the upper arm main frame element 51U. Bearings are not shown between the upper arm main frame element 51U and the T-shaped spinelike portion of the upper linear bearing assembly 36U. However it may readily be understood that bearings may be provided therebetween, typically held by races fixed to the member 36U, to allow for the bearings (not shown) to roll on the member 51U and to facilitate linear movement of the member 51U relative to the member 36U, along an axis substantially normal to the sheet of paper bearing the drawing.

Stated somewhat differently, this C-shaped transverse cross section of the main frame element 51U provides a longitudinal channel within which as noted above can be provided bearings as known in the art to facilitate the longitudinal movement of the main frame element 51U of the upper arm assembly 50U along its relatively linear path relative to the rotating outer turntable portion 34U. Such linear bearing configurations are as known in the art and one of any several linear bearing configurations may be used without departing from the present invention.

Under one embodiment of the invention, an elongate enclosure (not shown) may be provided along either of the arm frame elements. This elongate enclosure can provide protection for control wires, tubes, etc. which extend to the various elements of the apparatus 10 (See FIG. 1) including the label application head assembly 70 (See FIG. 2).

Upper and Lower Arm Assembly Drive Assemblies 60U, 60L

The upper and lower arm assembly drive assemblies 60U, 60L, are configured to move the upper and lower arm assemblies 50U, 50L, respectively, along their linear paths relative to the rotating outer turntable portions 34U, 34L, respectively. As noted elsewhere in this application, suitable linear bearings are provided as known in the art to facilitate this linear path movement.

Since the upper and lower arm assembly drive assemblies 60U, 60L are similar in configuration, assembly 60U will be explained by way of example.

Referring now to FIG. 3, upper arm assembly drive assembly 60U includes an upper motor 61U and an upper gearbox assembly 62U. Referring now also to FIG. 4, the gearbox assembly 62U includes an upper drive cog 64U and upper idler gears 65U. The upper motor 61U drives the gearbox assembly 62U by driving the drive cog 64U such that the upper drive cog 64U drives the upper cogged belt 53U as discussed earlier.

The upper motor 61U is mounted by a suitable mounting configuration (in one configuration an unshown angled bracket is used) so that it is rigidly mounted relative to the rotating outer turntable portion 34U. This motor 61U can be used on its own or can be used with an appropriate reduction box as needed to provide an outlet shaft torque and speed.

The gearbox assembly 62U (see FIG. 3) has a frame rigidly attached relative to the rotating outer turntable portion 34U. The gearbox assembly 62U is driven by the upper motor 61U, such that the upper drive cog 64U is rotatably driven. In actuality there is reduction in the gearbox assembly 62U; the upper drive cog is driven at a 1:4 ratio relative to the motor or motor/reduction assembly driving it. The gearbox assembly also includes two upper idler gears 65U (see FIG. 4) which are rotatably mounted relative to the frame of the gearbox assembly 62U, and provide guide means for the cogged belt.

As may be understood by reference to FIG. 4, the cogged belt 53U, which is not continuous but has discrete ends, has a middle portion threading through the assembly gearbox assembly 62U. The ends of the cogged belt 53U are fixed to the upper arm frame element 51U. The cogged belt 53U passes along a first of the two idler gears, then substantially around the upper drive cog 64U, and then passes along the second of the two idler gears. As may be understood, as the upper drive cog 64U drives the belt, it runs relatively along the length of the belt.

Therefore, it may be seen that the motor 61U drives the gearbox assembly 62U which has an output shaft (not shown), which drives the drive cog 64U. This drive cog 64U drives the cogged belt 53U.

It should be understood that the motor 61U could be braked as needed by a suitable brake known in the art, to provide a stopping control feature. Furthermore, an encoder mechanism is attached relative to the motor, such that feedback can be derived from the motor, effectively providing a servo-controlled motor. Generally speaking, there should be a control that outputs position of the motor.

In one embodiment, the motors 61U, 61L, are servo-controlled, similar and of fractional horsepower, approximately ½ horse power, and is configured to in one embodiment drive the one inch diameter cog sprocket about 1800 rpm.

In configuration, the force transferred to the belt was approximately 50 pounds, to get the acceleration required, although other configurations are contemplated under the present invention.

In one embodiment shown, the motors include an attached to a reducing assembly, which in one embodiment is a four-to-one reduction ratio.

Therefore it may be seen that the upper and lower arm assembly drive motors 61U, 61L, drive corresponding drive cogs (such as 64U) such that rotation of the shafts of the drive motors causes linear movement of the corresponding arm assemblies 50U, 50L along their longitudinal axis relative to rotating support tables 34U, 34L of the turntable assemblies 30U, 30L. The control of the rotation of these drive motors is provided by a control apparatus 120 such as a PLC discussed elsewhere in this application.

The upper and lower arm assembly drive motors 61U, 61L, have bases mounted relative to the rotating support tables 34U, 34L, respectively, of the upper and lower turntable assemblies 30U, 30L, respectively. However, the drive motors 61U, 61L, have corresponding drive shafts which support and drive the respective drive cogs 64U, 64L. Therefore it may be seen that the drive cogs 64U, 64L are rotatably driven about an axis that is stationary relative to the respective rotating support tables 34U, 34L, but these axes move around relative to the stationary frame 20.

It should also be understood that the rotating outer turntable portions 34U, 34L, respectively, of the upper turntable assemblies 30U, 30L respectively, are essentially in an "idle" mode relative to the supporting frame member 20. Although an arm assembly may move along its longitudinal axis relative to its corresponding rotating support table, the longitudinal axis will not always remain in the same orientation; it will be moved if the rotating support table rotates about its rotational axis.

As discussed above, the turntable assemblies 30U, 30L support the arm assemblies 50U, 50L at one location along the length of the arm main frame elements (51U, 51L). However, as shown in FIG. 1, the lower ends of the upper and lower upper arm assemblies 50U, 50L are pivotably attached at a pivot location "P", said pivot location being not at the end but proximate the end of the lower arm assembly 50L, said pivoting connection being substantially horizontal and along an axis parallel to the conveyor direction. This pivot axis is perpendicular to the paper of FIG. 1.

Label Application Head Assembly 70

Referring now also to FIG. 2, the label application head assembly 70 is rigidly attached relative to the lower end of the lower arm assembly 50L. The label application head assembly 70 includes the following elements: frame 71, servo motor 73, label application member 74, applicator position endless drive belt 75, home position indicator (laser) 79, and various control wires 78.

The frame 71 of the label applicator assembly 70 is rigidly affixed relative to the lower end of the lower arm main frame element 51L. This frame 71 is configured to support the servo motor 73, label application member 74, applicator position endless drive belt 75, home position indicator (laser) 79, and various control wires 78, as noted below.

The servo motor 73 has its base rigidly mounted relative to the frame 71 of the label applicator assembly 70. The servo motor 73 rotatably drives a drive pulley 73P about an axis 73A.

The label application member 74 is pivotably mounted relative to the frame 71 of the label applicator assembly 70 about an axis 74A. This pivoting relationship, along with the use of suitable servo control, allows for the label application member 74 to be pivoted to a known position relative to the application head assembly 70 and relative to the remainder of the apparatus 10, as needed, in order to attach labels both to vertical surfaces and to horizontal (typically top) surfaces, such as shown generally in FIGS. 1 and 7A/7B.

The endless drive belt 75 is attached both to the drive pulley 73P of the servo motor 73, and the driven pulley 74P of the label applicator 74. As may be understood, by operation of the servo motor 73, the angular position of the label applicator 74 can be adjusted as desired. In one embodiment, the range of the label applicator is approximately 155° relative to the conveyor surface. Control of the servo motor 73 is via control wires 78 such as known in the art.

Reference is made to FIGS. 7A and 7B to show the pivoting movement of the label application member 74. The function of the label application member 74 is to selectively retain a label on its discharge side (directed down in FIG. 7A and directed to the right in FIG. 7B), and selectively to discharge the label onto a package or other suitable surface proximate the discharge side of the label application member 74.

The label application head is substantially as known in the art, and provides a function of "picking up" holding a label thereon, and "blowing" the label a distance to a receiving surface, such as a surface of a package.

Although the label application member 74 is pivotably attached relative to the frame 71 by bearings such as known in the art, it is supplied with both air and electrical controls which are not all shown for purposes of clarity in illustration. As may be understood, the label applicator requires both air and electricity. Air (at a relatively low vacuum pressure provided by a fan) is used for holding the label on label side opening 74-L as needed, and a "blast" of air (from a high pressure source) is used in order to project the label from the grated label side opening 74-L onto an adjacent surface (such as a parcel).

The label application member includes an air passageway through it from fan side opening 74-F to label side opening 74-L. The suction is provided by a fan proximate fan side opening 74-F, which draws air into the label side opening 74-L to hold the labels thereon.

The blast of air is provided by positive pressure from a pressurized air line out of the label side opening 74-L shown in FIGS. 7A and 7B. The label application member 74 requires electricity and compressed air. In one preferred embodiment, an electric fan is for providing suction only. A separate positive air pressure (in one embodiment 80 pounds per square inch) is configured for blowing only.

The label applicator assembly 70 as noted above also includes a home position indicator, which in one embodiment is a laser beam 79B provided by a laser generating member 79. This laser beam is projected onto a stationary location such as the target T shown in FIG. 2. This allows for the machine operator to initially "zero" the label application head as desired, and also allows for periodic checking of the zero position as desired.

It should be understood that other location indicators could be used as known in the art in place of the laser-generating member 79, without departing from the spirit and scope of the present invention.

It may be understood that the laser-targeting device may be used as desired, and may not be used if not deemed necessary for preferred function.

The label generator carries several sensors on it that tells when the head 74 is back at the current position to pick up a new label. It also tells the operator/controller when the printer is in the correct position. It also has a service position when the paper is changed. A "label low indicator" is also provided which sends a signal back to the PLC.

The blow nozzles point one way, and the suction fan is blowing the other way. The suction fan is configured to suck the label onto the head of the label application member, and the blow nozzles send the label to its final destination.

In one configuration, the label is blown from 3 to 8 inches to its destination on a box surface. Although other configurations are contemplated, one configuration includes the use of 80 pounds per square inch for about 30 milliseconds.

The suction fan is configured in one embodiment to provide enough force to hold approximately three times the weight of the label, in order to maintain the label on the application head, even if the application head moves with approximately a three "G" force.

It should be understood that the labels can be blown onto vertical, horizontal, or even inclined surfaces. The rotation capability of the label application head assembly should be understood to provide such a capability.

Label Printer/Supplier 100

The label printer and supplier 100 is such as known in the art, and could include a blowing feature, to push the label onto the label application head, just to get it seated until the label applicator holds the label on its own.

A label printer/supplier is provided at 100. This element 100 can be an off-the-shelf item such as can be the conveyor. It should be noted that the distance between the label applicator assembly 70 when receiving a label from the label printer/supplier 100 tends to be more critical than the distance between the label applicator assembly 70 and a parcel side.

Control Apparatus 120

It should be understood that the configuration under the present invention is usable with a PLC (programmable logic controller), as opposed to more complex and expensive equipment, which reduces the cost.

FIG. 9 is a schematic view illustrating the operable connection and association between the control apparatus 120 (shown in one example as including a PLC) the motors 61U, 61L, and their associated servo amps 61U-S, 61L-S, the label applicator drive motor 73, the label printer 100, and the breakaway plate presence sensor 27. The servo amps 61U-S, 61L-S provide the necessary function between the control apparatus and the motors as known in the art. Also shown is a "Head in Nest" sensor 101, which is a sensor that recognizes when the label application head assembly 70 is in its "nest" which is the used to indicate that it is ready to receive labels. Also shown is a "Labels in Stock" sensor 102, which is configured to provide a signal to the PLC 120 that a certain pre-determined number of labels are left in the printer. This can be used for planning purposes; in one embodiment when the label printer 100 is out of labels, it sends a signal to the PLC, but by this time the system has to be stopped.

Also shown in FIG. 9 is a "label at head" sensor 103, which allows the system to know that the label applicator has transferred a label from the printer to the label applicator. Also shown is a "Printer Position" sensor 104, which provides an indication to the overall system that the printer is in its operating position. This is to be distinguished from a service position which may be used when the printer is being serviced or provided with Label stock. Also shown is a "Nest Plate" sensor 105, which is a sensor operably associated with a plate that acts as a last resort damage prevention device to prevent the label application head assembly 70 from colliding with the printer or other devices. This is to address an emergency condition to be avoided, such as if the label applicator has gone too far.

The connection with the label generator is through an Ethernet connection in one preferred embodiment. The other connections can be as known in the art.

The label generator also communicates the data to be printed on the label from the camera process through the PLC and then out to the label generator. Thus there is a communication link or a line between the PLC that controls the robot functions and the servos and the print generator device and the camera, if the camera is in the system.

Interaction with Other Apparatuses

It should be understood that the present invention is contemplated for use with conventional cameras and supply conveyors. For example, a camera can be used in association with the system in order to provide information to the system 10 sufficient to provide information regarding the position of the packages for receipt of the labels.

Method of Operation of the Apparatus

Generally described, the position of the label applicator assembly 70 of the apparatus 10 is controlled by controlling the upper and lower arm assembly servo drive motors 61U, 61L, and the servo motor 73 of the label applicator assembly 70 itself.

Under one embodiment of the invention, the apparatus is controlled in a "point-to-point" manner, that is, the machine is controlled to a degree sufficient to get the label applicator assembly 70 from one point to another and the particular path used is not seen as of primary concern. This is opposed to a "known path" technique, which sends the label applicator assembly 70 along a known path.

In one embodiment, the desired position is done by determining an "R" and a "Theta" of one of the arm assemblies, in one embodiment, the lower arm assembly 50L. This may be thought of as using polar equations. Attention is first given to the R and Theta of the lower arm assembly, and then the resulting R and Theta of the upper arm assembly is calculated by trigonometry. When these values have been calculated, the motors 61U, 61L are energized to move the label applicator assembly 70 as desired. The servo motor 73 of the label applicator assembly 70 itself is likewise controlled as needed by the use of trigonometric calculations.

Said another way, under one embodiment of the present invention, the system uses polar coordinates; in other words, the relative angular position, and the longitudinal movement of the arms are noted. The relative angular position of the label application head is also noted.

The invention under one embodiment also includes the use of what could be described as "equal timing accelerations" where both motors start at the same time, end at the same time, but they also accelerate for the same period of time. So, half of the move is acceleration (the first half), and the second half of the move is deceleration. This has been found to provide a smoother less "jerky" movement.

This could be understood as following a graph as shown in FIG. 8, which is a graph showing the rotational velocity of various elements of the invention over time. Particularly, the graph shows the rotational velocity of the motor 61U over time, the rotational velocity of the motor 61U over time, and the rotational velocity of the label application assembly's servo motor 73. In one operating embodiment, the two motors accelerate simultaneously and for the same period of time, reach their peak velocity at the same time at $t_1$, and then start decelerating to stop at the same time, at time $t_2$. The label application motor may operate differently depending on the amount of rotation needed.

As may be seen, the "motor" triangles are overlapping in time, but not necessarily overlapping in magnitude.

In order to minimize interference between the label application head 74 and the parcels, the present invention contemplates spending the least amount of time in the field of operation (where the parcel are going by). Instead of "hovering" over the packages as they come by, the label application head 74 is moved out of its home position in as much of a "single motion" as possible, with the arms going out while the head is rotating. Preferably, the label application head is in its desired position before the time the arms have stopped.

In one preferred embodiment, the rotation of the label application head 74 is synchronized to start at the same time as do the servo motors. The rotational head is calculated to finish its move in what could be considered the "minimum arm motion"—which means it is not synchronized to end at the same point, necessarily, but is timed to finish its shortest move in time to get the label at its desired position, which is the position at which the label will be dispensed.

The position is the "shortest move", with the shortest arm move being if the box were right up against the side of the bed. The head is set to rotate at a fixed velocity acceleration move every time, such that it's ready at its desired dispensing position when it enters the "action zone", regardless of whether it's going to be dispensed right at the edge of the action zone, or on the other side of it.

If the major arms do their move, they are preferably synchronized, in order to provide a smooth motion. The label application head assembly rotation is not timed to end at the same time the motors stop their movement (see FIG. 8), but it is configured in one embodiment to move at a set acceleration independent of the length of the long arm moves. Essentially, it accelerates a constant acceleration every time. Whether it has to move 5 degrees or 105 degrees, it is preferably going to have the same acceleration, regardless.

It may be understood that other control configurations may be provided under the present invention.

Under the present invention, the "point-to-point" nature of the device makes it simpler, and it was capable of doing calculations in the PLC within the 10 milliseconds that were provided, which is in one preferred embodiment the PLC update rate. So, this can be done with a PLC, rather than a motion controller, which saves significant expenses.

It may be understood that if one (e.g., the first) of the elongate arm assemblies is moved a linear distance relative to its respective turntable assembly, but the other (e.g., the second) elongate arm assembly is not moved relative to its respective turntable assembly, during this movement both of the turntable assemblies will rotate. This rotation may be in the same direction or in opposite directions.

Various Axes, Planes, Distances, and Orientations

The axes 32UA, 32LA, could be thought of as first and second "turntable axes", or second and first "turntable axes", as the case may be.

It may be understood that the pivoting connection between the two arms at P in FIG. 1 could be thought of as lying along an "arm pivoting connection axis". It may also be understood that this "arm pivoting connection axis" is substantially parallel to the turntable axes.

It may be understood that the conveying surface supporting the exemplary parcels 300 in one embodiment is substantially horizontal and upwardly facing, although other orientations are contemplated under the present invention. If may also be understood that this conveying surface could be thought of as lying in a "conveying plane" which in one embodiment could be considered a "horizontal conveying plane".

It may be said that a turntable or other axis can be "spaced a distance from the closest point of the conveying plane". For example, the upper turntable axis 32UA is spaced a certain distance above the conveyor surface, this distance being slightly higher than the distance the lower turntable axis is from the conveying surface. Words like "first turntable axis" and "second turntable axis" may be used under allowed practice to differentiate between two turntable axes without necessary identifying which of the upper or lower turntable axes correspond to the first or the second turntable axes.

The distance between the label application head member 74 and the label printer 100 is preferably about ¼ inch, in that the label travels about ¼ inch when being transferred from the printer to the label applicator. It has been found to be fairly critical that the positioning of the label on the label applicator is as close as possible and the inventors have found that a 1/16-inch tolerance for this position is preferable. If the label is too much to one side, the travel after it is blown can disadvantageously include a "tumble".

The label travels approximately 3 to 8 inches to the parcel surfaces when being blown from the label application head assembly 70.

Alternatives and Options

It should be understood that the present invention contemplates the provision of labels on items other than square or rectangular boxes, with the pivoting action available, boxes or other items may be labeled on angular surfaces such as might be encountered on a box having a triangular peripheral cross section.

It should also be understood that the apparatus and method according to the present invention could be used to apply not only relatively thin adhesive labels, including but not limited those including two-dimensional codes such as Barcode or Maxicode, but could also be used to apply thicker labels, including RFID labels. The invention could also be used as a scanner by using a scanner on the head, and manipulating the scanner as desired to pick up bar or other codes at various locations.

CONCLUSION

The resulting apparatus, having a three-point "fixing" feature (one each at the turntables and the third at the arm pivot connection) has been found to be significantly stable for its weight. This is advantageous from both a speed and cost standpoint. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

ELEMENT LIST

5 Labels
10 Apparatus
20 Support Frame
21 Frame Members (typ)
22 Breakaway Support Plate
25 Tension Spring
27 Presence Sensor
30U Upper Turntable Assembly
31U Stationary Inner Turntable Portion
32U Turntable Bearings
34U Rotating Outer Turntable Portion (of Upper Turntable Assembly 30U)
30L Lower Turntable Assembly
31L Stationary Inner Turntable Portion
32L Turntable Bearings
34L Rotating Outer Turntable Portion (of Lower Turntable Assembly 30L)
36U Upper Arm Linear Bearing Assembly
37U Linear Bearings
36L Lower Arm Linear Bearing Assembly
37L Linear Bearings
50U Upper Arm Assembly
51U Upper Arm Main Frame Element

53U Upper cogged Belt
50L Lower Arm Assembly
51L Lower Arm Main Frame Element
53L Cogged Belt
60U Upper Arm Assembly Drive Assembly
61U Upper Motor
62U Upper Gearbox Assembly
64U Upper Drive Cog
65U Upper Idler Gears
60L Lower Arm Assembly Drive Assembly
61L Lower Motor
62L Lower Gearbox Assembly
64L Lower Drive Cog
65L Lower Idler Gears
70 Label Application Head Assembly
71 Frame
73 Servo Motor
73P Drive Pulley
73A Axis
74 Label Application Member
74-F Fan Side Opening
74-L Label Side Opening
74P Driven Pulley
74A Axis
75 Drive Belt
78 Control Wires (typ)
79 Laser
79B Laser Beam
100 Label Printer/Supplier
101 "Head in Nest" Sensor
102 "Labels in Stock" Sensor
103 "Label at Head" Sensor
104 "Printer Position" Sensor
105 Head Overtravel Sensor
120 Control Apparatus
200 Conveyor
300 Parcels (or other items)

That which is claimed:

1. An apparatus for transferring labels or other items to an outer surface of parcels being conveyed along a conveying path, said path having a width and defined by a conveying surface having a portion lying in a conveying plane, said parcels having horizontal and vertical surfaces, said apparatus comprising:

a relatively stationary frame;

a first turntable assembly, said first turntable assembly itself comprising:

a first stationary turntable portion attached relative to said stationary frame; and a first rotating turntable portion rotatably attached relative to said first stationary turntable portion such that said first rotating turntable portion can rotate about a first turntable axis relative to said first stationary turntable portion and said frame;

a second turntable assembly, said second turntable assembly itself comprising:

a second stationary turntable portion attached relative to said stationary frame; and a second rotating turntable portion rotatably attached relative to said second stationary turntable portion such that said second rotating turntable portion can rotate about a second turntable axis relative to said second stationary turntable portion and said frame;

a first elongate arm mounted relative to said first rotating turntable portion so as to allow for linear movement of said first elongate arm relative to said first rotating turntable portion along a first linear path substantially parallel to the longitudinal axis of said first elongate arm, yet said first elongate arm is also allowed to rotate about said first turntable axis along with said first rotating turntable portion;

a second elongate arm mounted relative to said second rotating turntable portion so as to allow for linear movement of said second elongate arm relative to said second rotating turntable portion along a second linear path substantially parallel to the longitudinal axis of said second elongate arm, yet said second elongate arm is also allowed to rotate about said second turntable axis along with said second rotating turntable portion;

a pivoting connection intermediate and connecting said first and second elongate arms;

a first arm drive means to provide a force sufficient to cause said first elongate arm to move along said first linear path relative to said first rotating turntable portion;

a second arm drive means to provide a force sufficient to cause said second elongate arm to move along said second linear path relative to said second rotating turntable portion; and a label application head attached relative to one of said first and second elongate arms, such that said label application head may be moved to various locations across the width of said conveyor path and at different heights relative to said conveyor surface, and said label application head may be manipulated to dispense labels or other items upon surfaces of parcels being conveyed along said conveying surface.

2. The apparatus as claimed in claim 1, wherein the attachment of said label application head is comprised of a pivoting connection intermediate the lower end of at least one of the elongate arm members and said label application head, to allow said labels or other items to be attached to both horizontal and vertical parcel surfaces.

3. An apparatus for transferring labels or other items to an outer surface of parcels being conveyed along a conveying path, said path having a width and defined by a conveying surface having a portion lying in a conveying plane, said parcels having horizontal and vertical surfaces, said apparatus comprising:

a relatively stationary frame;

a first turntable assembly, said first turntable assembly itself comprising:

a first stationary turntable portion attached relative to said stationary frame; and a first rotating turntable portion rotatably attached relative to said first stationary turntable portion such that said first rotating turntable portion can rotate about a first turntable axis relative to said first stationary turntable portion and said frame, said first turntable axis being spaced a first distance from the closest point of said conveying plane;

a second turntable assembly, said second turntable assembly itself comprising:

a second stationary turntable portion attached relative to said stationary frame; and a second rotating turntable portion rotatably attached relative to said second stationary turntable portion such that said second rotating turntable portion can rotate about a second turntable axis relative to said second stationary turntable portion and said frame, said second turntable axis spaced a second distance from the closest point of said conveying plane;

a first elongate arm mounted relative to said first rotating turntable portion so as to allow for linear movement of said first elongate arm relative to said first rotating turntable portion along a first linear path substantially parallel to the longitudinal axis of said first elongate arm, yet said first elongate arm is also allowed to rotate about said first turntable axis along with said first rotating turntable portion;

a second elongate arm mounted relative to said second rotating turntable portion so as to allow for linear movement of said second elongate arm relative to said second rotating turntable portion along a second linear path substantially parallel to the longitudinal axis of said second elongate arm, yet said second elongate arm is also allowed to rotate about said second turntable axis along with said second rotating turntable portion;

a pivoting connection intermediate and connecting said first and second elongate arms, said pivoting connection being along an arm pivoting connection axis that is substantially parallel to said first and second turntable axes, and said arm pivoting connection axis being spaced a third distance from the closest of said conveying plane, said third distance being less than either one of said first or second distances referenced above;

a first arm drive means to provide a force sufficient to cause said first elongate arm to move along said first linear path relative to said first rotating turntable portion;

a second arm drive means to provide a force sufficient to cause said second elongate arm to move along said second linear path relative to said second rotating turntable portion; and a label application head pivotably attached about a label head pivot axis relative to one of said first and second elongate arms, said label head pivot axis being substantially parallel to said first and second turntable axes, wherein said label application head may be manipulated about said label head pivot axis, and at the same time said first and second arm drive means may be operated so as to cause said first and second arm assemblies to move along said first and second linear paths, respectively, relative to said first and second rotating turntable portions, respectively, such that said label application head may be moved to various locations across the width of said conveyor path and at different heights relative to said conveyor surface, and said label application head may be manipulated at suitably different orientations to dispense labels or other items upon both horizontal and vertical surfaces of parcels being conveyed along said conveying surface.

4. The apparatus as claimed in claim 3 wherein said first and second elongate arms are configured to move back and forth along said linear paths relative to said first and second rotating turntable portions, respectively.

5. The apparatus as claimed in claim 4, further comprising first and second linear bearing assemblies to facilitate said linear movement of said first and second elongate leg members along said paths.

6. The apparatus as claimed in claim 3, wherein said label application head is attached proximate the end of said first elongate arm.

7. The apparatus as claimed in claim 3, wherein said turntable assemblies are not powered but are free to idle.

8. The apparatus as claimed in claim 7, wherein said first arm drive means is configured to provide a force sufficient to cause rotation of said first and second arms about said first and second turntable axes as said first arm drive means provides a force sufficient to cause said first arm to move along said first linear path relative to said first rotating turntable portion.

9. The apparatus as claimed in claim 7, further comprising a control device configured for controlling said first and second arm drive means, such that in one mode of operation of the apparatus, operation of said first arm drive means but not said second arm drive means causes said first elongate arm to move along a linear path relative to said first stationary turntable portion, both rotating turntable portions to rotate, and said label application head to rotate about said second turntable axis.

10. The apparatus as claimed in claim 9, wherein said first and second rotating turntable portions rotate in the same or in the opposite direction during movement of the label applicator head.

11. The apparatus as claimed in claim 3, wherein said first and second arm drive means are configured such that operation of said first arm drive means, but not said second arm drive means, causes the axis of said pivoting connection between said two arms to pivot about said second turntable axis, and such that actuation of said second arm drive means, but not said first arm drive means, causes the axis of said pivoting connection between said two arms to pivot about said first turntable axis, and such that combined operation of said first and second arm drive means causes the axis of said pivoting connection between said two arms to move relative to both turntable axes.

12. The apparatus as claimed in claim 3, wherein said first and second arm drive means are configured such that operation of said first and second arm drive means, combined with the pivoting of said label application head, allows said label application head to apply labels in a plurality of directions, over a range exceeding 90 degrees.

13. The apparatus as claimed in claim 3, wherein said label application head is configured to apply labels to the vertical sides of parcels, or to the horizontal tops of parcels, as they pass along said conveyor path.

14. The apparatus as claimed in claim 3, further comprising a motor configured for controlling rotation of said label application head relative to said first or second support arm member.

15. The apparatus as claimed in claim 14, wherein said motor is a servo-controlled motor.

16. The apparatus as claimed in claim 3, wherein said label application head is configured to accept and dispense labels, and further comprising a label supplier configured to supply a label to said label application head.

17. The apparatus as claimed in claim 16, further comprising a control device operably associated with said first and second motors and said label application head to cause said arms to be moved into two positions, a first position such that said label application head is in a position to facilitate label transfer from said label supply apparatus to said label applicator head and, and a second position such that said label application head is in a position to facilitate label transfer from said label applicator head to a parcel on said conveyor.

18. The apparatus as claimed in claim 3 wherein said label application head is supplied with compressed air to facilitate forced blowing of the label said label application head, and wherein said label application head further comprises an electric fan to facilitate retention of labels on said label application head by vacuum.

19. An apparatus for transferring labels or other items to an outer surface of a parcels being conveyed along a conveying path, said path having a width and defined by an upwardly-directed substantially horizontal conveying surface having a portion lying in a horizontal conveying plane, said parcels having horizontal and vertical surfaces, said apparatus comprising:

a relatively stationary frame;

a first turntable assembly, said first turntable assembly itself comprising:

a first stationary turntable portion attached relative to said stationary frame; and a first rotating turntable portion rotatably attached relative to said first stationary turntable portion such that said first rotating turntable portion can rotate about a first turntable axis relative to said first stationary turntable portion and said frame, said first turntable axis being spaced a first distance from the closest point of said conveying plane;

a second turntable assembly, said second turntable assembly itself comprising:

a second stationary turntable portion attached relative to said stationary frame; and a second rotating turntable portion rotatably attached relative to said second stationary turntable portion such that said second rotating turntable portion can rotate about a second turntable axis relative to said second stationary turntable portion and said frame, said second turntable axis spaced a second distance from the closest point of said conveying plane;

a first elongate arm assembly including a first elongate arm mounted relative to said first rotating turntable portion so as to allow for linear movement of said first elongate arm relative to said first rotating turntable portion along a first linear path substantially parallel to the longitudinal axis of said first elongate arm, yet said first elongate arm is also allowed to rotate about said first turntable axis along with said first rotating turntable portion, said first elongate arm assembly also including a first cogged belt being elongate and having its ends attached to said first elongate arm;

a second elongate arm assembly including a second elongate arm mounted relative to said second rotating turntable portion so as to allow for linear movement of said second elongate arm relative to said second rotating turntable portion along a second linear path substantially parallel to the longitudinal axis of said second elongate arm, yet said second elongate arm is also allowed to rotate about said second turntable axis along with said second rotating turntable portion, said second elongate arm assembly also including a second cogged belt being elongate and having its ends attached to said second elongate arm;

a pivoting connection intermediate and connecting said first and second elongate arms, said pivoting connection being along an arm pivoting connection axis that is substantially parallel to said first and second turntable axes, and said arm pivoting connection axis being spaced a third distance from the closest of said conveying plane, said third distance being less than either one of said first or second distances referenced above;

a first arm drive means itself comprising:

a first motor; and a first drive cog;

said first drive cog configured to engage said first cogged belt of said first elongate arm assembly and said first motor configured to drive said drive cog to provide a force sufficient to cause said first elongate arm to move along said first linear path relative to said first rotating turntable portion;

a second arm drive means itself comprising:

a second motor; and a second drive cog;

said second drive cog configured to engage said second cogged belt of said second elongate arm assembly and said second motor configured to drive said second drive cog to provide a force sufficient to cause said second elongate arm to move along said second linear path relative to said second rotating turntable portion;

a label application head pivotably attached about a label head pivot axis relative to one of said first and second elongate arms, said label head pivot axis being substantially parallel to said first and second turntable axes, wherein said label application head may be manipulated about said label head pivot axis, and at the same time said first and second arm drive means may be operated so as to cause said first and second arm assemblies to move along said first and second linear paths, respectively, relative to said first and second rotating turntable portions, respectively, such that said label application head may be moved to various locations across the width of said conveyor path and at different heights relative to said conveyor surface, and said label application head may be manipulated to dispense labels upon both horizontal and vertical surfaces of parcels being conveyed along said conveying surface.

* * * * *